US011869358B2

(12) United States Patent
Takemura (10) Patent No.: US 11,869,358 B2
(45) Date of Patent: Jan. 9, 2024

(54) SYSTEM AND METHOD FOR WARNING OF A PRESENCE OF A MOBILE TARGET

(71) Applicant: Nortak Software Ltd., Ottawa (CA)

(72) Inventor: Norio Takemura, Ottawa (CA)

(73) Assignee: Nortak Software Ltd., Ottawa (CA)

( * ) Notice: Subject to any disclaimer, the term of this patent is extended or adjusted under 35 U.S.C. 154(b) by 161 days.

(21) Appl. No.: 17/514,575

(22) Filed: Oct. 29, 2021

(65) Prior Publication Data

US 2023/0134148 A1 May 4, 2023

(51) Int. Cl.
*G08G 1/16* (2006.01)
*G06V 20/54* (2022.01)
*G06V 10/70* (2022.01)
*G06T 7/70* (2017.01)

(52) U.S. Cl.
CPC ............... *G08G 1/167* (2013.01); *G06T 7/70* (2017.01); *G06V 10/70* (2022.01); *G06V 20/54* (2022.01); *G08G 1/164* (2013.01); *G08G 1/166* (2013.01); *G06T 2207/10048* (2013.01); *G06T 2207/30236* (2013.01)

(58) Field of Classification Search
CPC ............. G06T 7/70; G06T 2207/10048; G06T 2207/30236; G06V 10/70; G06V 20/54; G08G 1/164; G08G 1/166
See application file for complete search history.

(56) References Cited

U.S. PATENT DOCUMENTS

| 6,078,439 | A | 6/2000 | Silhengst et al. |
| 6,116,814 | A | 9/2000 | Dietrichson |
| 6,249,375 | B1 | 6/2001 | Silhengst et al. |
| 9,268,078 | B2 | 2/2016 | Schuch et al. |
| 9,418,546 | B1 * | 8/2016 | Whiting ............... G08G 1/0133 |
| 10,032,371 | B2 * | 7/2018 | Gonzales ................. B60Q 1/00 |
| 10,467,901 | B2 * | 11/2019 | Ikehara .................. G06V 20/52 |
| 10,872,530 | B2 * | 12/2020 | Budde .................... G08G 1/166 |
| 2005/0286145 | A1 | 12/2005 | Silhengst et al. |

(Continued)

FOREIGN PATENT DOCUMENTS

| CN | 202887476 | 4/2013 |
| CN | 206322325 | 7/2017 |

(Continued)

OTHER PUBLICATIONS

Wei Liu, et al. SSD: Single Shot MultiBox Detector, Dec. 29, 2016.

*Primary Examiner* — Sisay Yacob
(74) *Attorney, Agent, or Firm* — Brion Raffoul (57) ABSTRACT

System and method for providing a warning to a motorist of the presence of a mobile target in an area, when at least one projected path of the motor vehicle intersects at least one projected target path. A sensor obtains an image of the area and passes the image to a data processing unit. The data processing unit comprises an image analysis module that is used to analyze the image to detect the presence of a target, such as a bicycle, in the area. The image analysis module uses artificial intelligence methods to analyze the image. When a mobile target is detected in the area, a signal is generated and passed to a display unit. The display unit then displays a visible warning of the presence of the target to the motorist. In one embodiment, the area includes a blind spot of a motor vehicle operated by the motorist.

21 Claims, 9 Drawing Sheets

(56) References Cited

U.S. PATENT DOCUMENTS

| | | |
|---|---|---|
| 2009/0256723 A1 | 10/2009 | Peddie et al. |
| 2010/0007721 A1* | 1/2010 | Kim .................... H04N 13/351 |
| | | 348/E13.001 |
| 2011/0316719 A1 | 12/2011 | Obuchi et al. |
| 2017/0309174 A1* | 10/2017 | Gonzales ............... G08B 21/02 |
| 2018/0089997 A1 | 3/2018 | Ho et al. |
| 2018/0090010 A1* | 3/2018 | Ikehara .................. G08G 1/166 |
| 2020/0279486 A1* | 9/2020 | Budde .................... G08G 1/164 |

FOREIGN PATENT DOCUMENTS

| | | |
|---|---|---|
| EP | 0470947 | 2/1992 |
| EP | 0565765 | 10/1993 |
| EP | 0757263 | 2/1997 |
| EP | 0757268 | 2/1997 |
| EP | 0860805 | 8/1998 |
| EP | 1091167 | 4/2001 |
| EP | 1107210 | 6/2001 |
| EP | 1347099 | 9/2003 |
| EP | 1432874 | 6/2004 |
| EP | 1503228 | 2/2005 |
| EP | 1593109 | 11/2005 |
| EP | 1916643 | 4/2008 |
| EP | 1930862 | 6/2008 |
| EP | 2045792 | 4/2009 |
| EP | 2058786 | 5/2009 |
| EP | 2264972 | 12/2010 |
| EP | 2462574 | 6/2012 |
| EP | 2790165 | 10/2014 |
| EP | 2924334 | 9/2015 |
| EP | 2924345 | 9/2015 |
| EP | 3182394 | 6/2017 |
| EP | 3203137 | 8/2017 |
| EP | 3499118 | 6/2019 |
| JP | 2014115757 | 6/2014 |
| WO | 2014086408 | 6/2014 |

* cited by examiner

SYSTEM AND METHOD FOR WARNING OF A PRESENCE OF A MOBILE TARGET

TECHNICAL FIELD

The present invention relates to traffic signs. More specifically, the present invention relates to a system and method for providing a warning of a mobile target's presence.

BACKGROUND

Many collisions between vehicles occur when one is turning and another is continuing straight ahead, such that the turning vehicle crosses the other's vehicle path. In particular, many collisions involving motor vehicles and bicycles occur when a bicycle is in a motor vehicle's blind spot or is otherwise difficult to see, and the motor vehicle is turning across the bicycle's path. In North America, this form of accident is often referred to as a "right hook". In such an accident, the motor vehicle and bicycle are, at first, travelling in the same direction on a roadway, before the motorist turns right without regard to the bicycle.

Collisions with motor vehicles are frequently fatal for cyclists. For example, in 2019 in the US, 843 cyclists died in collisions with motor vehicles (based on data from the National Highway Traffic Safety Administration's Fatality Analysis Reporting System). Clearly, there is a need for systems and methods that reduce the frequency and/or severity of such collisions, for instance by providing additional warning to motorists of the presence of bicyclists and/or other mobile targets in the area.

SUMMARY

This document discloses a system and method for providing a warning to a motorist of the presence of a target, when at least one projected path of the motor vehicle operated by the motorist intersects at least one projected target path. A sensor obtains an image of the area and passes the image to a data processing unit. The data processing unit comprises an image analysis module that is used to analyze the image to detect the presence of a target, such as a bicycle, in the area. The image analysis module uses artificial intelligence methods to analyze the image. When a mobile target is detected in the area, a signal is generated and passed to a display unit. The display unit then displays a visible warning of the presence of the target to the motorist. In some embodiments, the area is a roadway. In one embodiment, the area includes a blind spot of a motor vehicle operated by the motorist.

In a first aspect, this document discloses a system for displaying a warning of a presence of a mobile target, said system comprising: a sensor for obtaining an image of an area; a data processing unit for receiving said image, said data processing unit comprising an image analysis module for determining said presence of said target when said target is within said area and wherein said data processing unit generates a signal when said target is determined to be present within said area; and a display unit for receiving said signal and for displaying said warning, wherein said warning is a visual warning, wherein said display unit is positioned at a roadway such that said display unit is visible to a driver of a motor vehicle on said roadway, wherein at least one projected path of the motor vehicle intersects at least one projected target path, and wherein said image analysis module uses artificial intelligence to analyze said image.

In another embodiment, this document discloses a system wherein said mobile target comprises at least one of: a bicycle; a cyclist; a pedestrian; a foot-powered vehicle; a pedal-powered vehicle; a limited-speed vehicle; a low-speed vehicle; and an operator of at least one of a foot-powered vehicle; a pedal-powered vehicle; a limited-speed vehicle; and a low-speed vehicle.

In another embodiment, this document discloses a system wherein said area is a part of said roadway.

In another embodiment, this document discloses a system wherein said area includes a region adjacent to said motor vehicle.

In another embodiment, this document discloses a system wherein said region includes a blind spot of said driver.

In another embodiment, this document discloses a system wherein said mobile target travels in a same direction as said motor vehicle.

In another embodiment, this document discloses a system wherein said sensor is an infrared imaging device.

In another embodiment, this document discloses a system wherein images of said area are received from multiple sensors.

In another embodiment, this document discloses a system wherein said display unit displays a default indicia until receiving said signal from said data processing unit.

In another embodiment, this document discloses a system wherein said sensor and said display unit are integrated into a single physical device.

In a second aspect, this document discloses a method for displaying a warning of a presence of a mobile target, said method comprising: receiving an image of an area; analyzing said image to determine said presence of said target when said target is within said area; generating a signal when said target is determined to be present within said area; sending said signal to a display unit; and displaying said warning on said display unit, wherein said warning is a visual warning, wherein said display unit is positioned at a roadway such that said display unit is visible to a driver of a motor vehicle on said roadway, wherein at least one projected path of the motor vehicle intersects at least one projected target path, and wherein analyzing said image uses artificial intelligence.

In another embodiment, this document discloses a method wherein said mobile target comprises at least one of: a bicycle; a cyclist; a pedestrian; a foot-powered vehicle; a pedal-powered vehicle; a limited-speed vehicle; a low-speed vehicle; and an operator of at least one of a foot-powered vehicle; a pedal-powered vehicle; a limited-speed vehicle; and a low-speed vehicle.

In another embodiment, this document discloses a method wherein said area is a part of said roadway.

In another embodiment, this document discloses a method wherein said area includes a region adjacent to said motor vehicle.

In another embodiment, this document discloses a method wherein said region includes a blind spot of said driver.

In another embodiment, this document discloses a method wherein said mobile target travels in a same direction as said motor vehicle.

In another embodiment, this document discloses a method wherein said image is received from an infrared imaging device.

In another embodiment, this document discloses a method wherein multiple simultaneous images of said area are received, wherein said multiple simultaneous images cover said area from different viewpoints.

In another embodiment, this document discloses a method wherein said display unit displays a default indicia until receiving said signal from said data processing unit.

In another embodiment, this document discloses a method wherein said sensor and said display unit are integrated into a single physical device.

In a third aspect, this document discloses non-transitory computer-readable media having encoded thereon computer-readable and computer-executable instructions that, when executed, implement a method for displaying a warning of a presence of a mobile target, said method comprising: receiving an image of an area; analyzing said image to determine said presence of said target when said target is within said area; generating a signal when said target is determined to be present within said area; sending said signal to a display unit; and displaying said warning on said display unit, wherein said warning is a visual warning, wherein said display unit is positioned at a roadway such that said display unit is visible to a driver of a motor vehicle on said roadway, wherein at least one projected path of the motor vehicle intersects at least one projected target path, and wherein analyzing said image uses artificial intelligence.

BRIEF DESCRIPTION OF THE DRAWINGS

The present invention will now be described by reference to the following figures, in which identical reference numerals refer to identical elements and in which.

DETAILED DESCRIPTION

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

The present invention provides a system and method for providing a warning of a target's presence to a motorist when at least one projected path of the motor vehicle operated by the motorist intersects at least one projected target path. A sensor obtains an image of the area and passes the image to a data processing unit. The data processing unit comprises an image analysis module that is used to analyze the image to detect the presence of a target, such as a bicycle, in the area. The image analysis module uses artificial intelligence methods to analyze the image. When a target is detected in the area, a signal is generated and passed to a display unit. The display unit then displays a warning of the presence of the target to the motorist. The display unit is positioned at a roadway such that said display unit is visible to the motorist.

It should of course be understood that embodiments of the present invention are not limited to the detection of bicycles. That is, the term 'target' as used herein should be understood to include conventional bicycles, electronic bicycles, cargo bicycles, and tricycles and electric tricycles, and also to include, without limitation, pedal- or foot-powered vehicles and low- or limited-speed motorized vehicles, such as skateboards, scooters, e-scooters, mobility devices, mopeds, and the like. The term 'target' as used herein should also be understood as including pedestrians, including running and/or jogging pedestrians, dismounted riders of bicycles, etc. In some embodiments, the system comprises separate detection modules for each class of mobile target to be detected. In other embodiments, a single detection module may be used that can identify and classify different classes of mobile targets. Further, in some embodiments, the display unit displays a single warning indicia for every detected mobile target, regardless of the mobile target's class (e.g., a single flashing warning light). In other embodiments, the display unit displays separate indicia for separate classes (e.g., a flashing 'stick figure' for a detected pedestrian, a flashing stylized bicycle for a detected bicycle).

Similarly, it should be understood that the term 'motor vehicle' as used herein should be understood to included cars, trucks, vans, motorcycles, and other motorized vehicles that typically use conventional roadways. Of course, however, embodiments of the present invention may be configured for use in bicycle-only networks and other networks (for example, to warn bicyclists of other approaching bicycles around a blind junction). As would be understood by the person skilled in the art, the embodiments of the invention can be configured for any suitable intersection, traffic pattern, and/or need.

Figure 1:
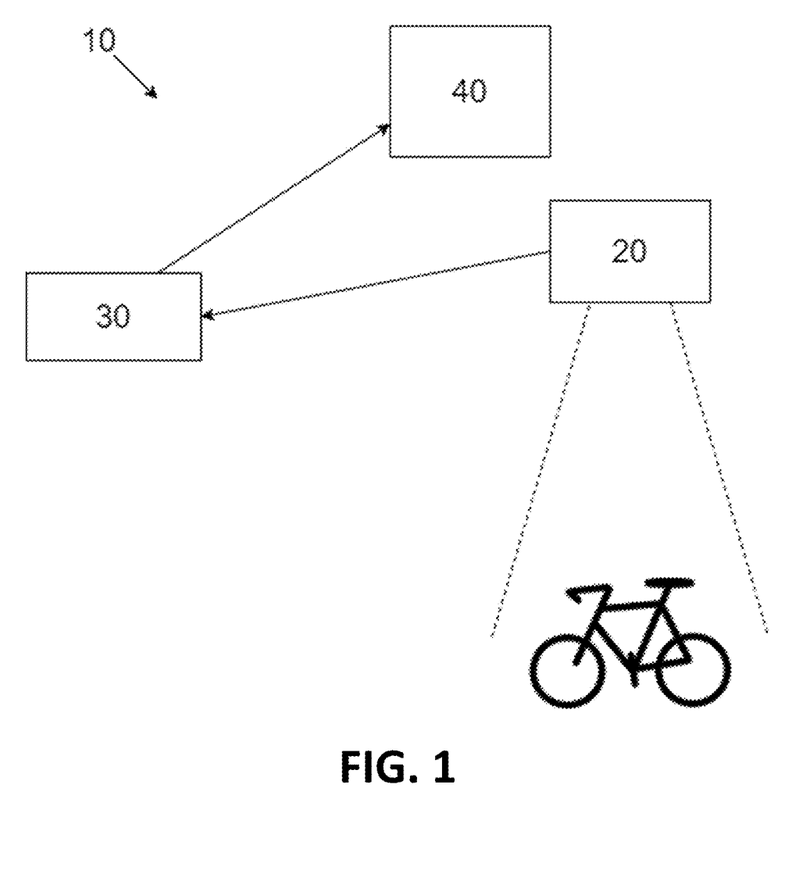
FIG. 1 is a block diagram of a system according to one aspect of the invention.

FIG. 1 is a block diagram of a system according to one aspect of the invention. In the system 10, a sensor 20 passes an image to at least one data processing unit 30. When a mobile target (such as the illustrated bicycle in FIG. 1) is detected within the area observed by the sensor 20, the data processing unit 30 generates a signal that is passed to a display unit 40. The system is preferably positioned so that the sensor's field of view (i.e., the area to be imaged) covers a roadway, and contains at least a region of the roadway adjacent to a motor vehicle and/or a motor vehicle's lane of travel. In one preferable embodiment, the system is positioned so that the area to be imaged covers a blind spot of a motor vehicle approaching the display.

The display unit 40 is preferably positioned so as to be easily visible to a motorist travelling towards the display unit 40. Of course, the specific positioning would depend on the specific intersection where the display unit is to be used. In some embodiments, the display unit 40 displays only a visual warning. In other embodiments, the warning comprises an audio warning as well as a visual warning.

In some embodiments, the sensor 20 and display unit 40 are physically separate from each other. In other embodiments, the sensor 20 and display unit 40 are integrated into a single device. Additionally, in some embodiments, the data processing unit 30 is remote from the sensor 20 and the display unit 40. In some such embodiments, the image and signal can be passed to and from the data processing unit 30 over a network, such as the Internet, a cellular network, a wide area network (WAN), etc. In other embodiments, the data processing unit 30 may be linked to the sensor 20 and the display unit 40 via wired connections.

In particular, in some embodiments, a single data processing unit 30 is associated with a single display unit 40 and a single sensor 20, and all three components are integrated into a single device. That is, in such embodiments, each physical device would have a single dedicated sensor 20, a single dedicated data processing unit 30, and a single dedicated display unit 40.

Additionally, in some embodiments, the data processing unit 30 sends a 'heartbeat' signal (i.e., a predetermined identifier signal) to a server and/or to a centralized monitoring system (such as, without limitation, a traffic control centre). Such a heartbeat signal is preferably sent at regular and predetermined intervals (e.g., every five minutes, etc.). When the heartbeat signal is successfully received by the server/centralized system, no action needs to be taken. However, if the heartbeat signal is not received at an expected point, this could indicate that the data processing unit 30 is malfunctioning. In such an embodiment, the traffic control centre or other operator of the centralized system/server could send maintenance personnel to assess the data processing unit 30 and/or display unit 40, and/or to conduct repairs. Further, in some embodiments, the heartbeat signal comprises information related to the 'health' and/or performance of the data processing unit 30 and/or display unit 40. That is, although, in some embodiments, the heartbeat signal is merely a signal indicating 'device still working', in other embodiments, the heartbeat signal is more informative. For example, the heartbeat signal may be used to indicate 'data processing unit still working, but display unit must be replaced', or any other maintenance- or device-related message In still other embodiments, the data processing unit 30 is integrated with the sensor 20 and/or the display unit 40. In such embodiments, no remote or network connections are needed. Such embodiments may be useful where network connectivity is difficult, slow, and/or expensive (e.g., geographically remote locations).

In some embodiments, images are continuously analyzed, or analyzed at frequent intervals. In one embodiment, the sensor 20 obtains images at a rate of 15 to 20 frames per second. Each image is analyzed when it is provided to the data processing unit, to provide a near-real-time warning.

In some embodiments, the at least one data processing unit 30 comprises multiple separate processing units. For example, in one embodiment, a first data processing unit 30A receives and processes images and communicates with a second data processing unit 30B. The second data processing unit 30B in this example can control the display unit 40. Use of multiple data processing units 30 in such a manner can, depending on the implementation, reduce the load on any individual data processing unit 30, thus decreasing heat output and/or improving performance of the data processing units 30 and of the system 10.

Alternatively, in some embodiments, images are received by the data processing unit 30 from multiple sensors 20. These sensors 20 preferably cover the same area from multiple different viewpoints. The data processing unit 30 can then analyze each image to better establish whether a target is detected. Depending on the desired implementation, multiple sensors and/or multiple data processing units may be used and/or associated with each other and/or with single or multiple display units. For example, in embodiments where the data processing unit 30 is implemented in a distributed/remote manner (e.g., 'on the cloud'), multiple sensors 20 may send images to the data processing unit 30, which may then send directions to multiple distinct display units 40. In other embodiments, as also described above, each sensor 20 requires a single dedicated data processing unit 30. The person skilled in the art would be able to determine the number of sensors 20 and/or sensor/data processing unit pairs that are suitable/desirable for a given intersection.

As noted above, the at least one data processing unit 30 comprises an image analysis module that applies artificial intelligence methods to analyze the image. In one embodiment, the artificial intelligence methods include computer vision techniques.

In a preferred implementation of the invention, the image analysis module implements a Single Shot MultiBox Detector ("SSD") technique as known in the art from references [1] and [2], identified below. This technique applies several default boxes with different aspect ratios to each image and uses a single neural network with several convolutional layers. The convolutional layers predict the presence of a target object (e.g., a bicycle) in a default box. Based on those predictions, the box boundaries are adjusted. The convolutional layers also progressively decrease in size, resulting in steadily more precise bounding boxes around the target object(s). This approach enables rapid processing when compared with other AI methods.

A general training process for an SSD implementation is as follows:

Step 1: Find or Generate Images of the Objects of Interest

Take photos, download images from libraries, or collect images as stills from available video. The objects are preferably pictured at various angles and scales. The images are preferably uniform or near uniform in size. For example, the images are preferably all approximately 300×300 pixels, or 400×350 pixels, etc. As should be clear, the size of the training images should be approximately equivalent to the size of images that will be received from the sensors 20.

Step 2: Annotate the Training Images

Label/annotate the images so that the objects of interest (e.g., bicycles and other mobile targets) are labeled. Many labelling processes, including without limitation, methods of placing bounding boxes around the objects of interest, are known in the art.

Step 3: Organize the Images for Training

Set aside a subset of the labelled images to be used for evaluating the performance of the training run.

Step 4: Train a Network on the Custom Data

After the image dataset is labelled and subdivided, third-party tools and networks, such as the Google™ Colab™ network, can be used to perform the training, using the prepared dataset and model code.

Step 5: Evaluation

Evaluation of the model accuracy can be run in parallel with training, and is preferably human-supervised.

More details can be found in references [1] and [2]. Of course, the above-described method is merely one possible implementation of the image analysis for mobile target detection encompassed by this invention. Other specific implementations of image analysis are possible. However, image analysis systems that have high accuracy and can operate in near-real-time are needed.

In some embodiments, the warning is displayed until the mobile target has left the sensor's field of view. Such embodiments would require continuous or nearly continuous analysis of new images, to determine when the mobile target has moved on. In other embodiments, the warning is displayed for a fixed length of time. For example, the warning may be displayed for thirty seconds after a mobile target has been detected in the area. Such embodiments would only require the system to analyze new images once the duration of the timer has completed. Of course, as would be clear to the person skilled in the art, suitable timing would depend on various factors, including the size of the area within the sensor's field of view, the distance between the display and the relevant intersection, the speed limit(s) for traffic within the area, and so on. In some embodiments, the duration of the timer is adjustable.

In preferred embodiments, the display unit displays a default indicia (e.g., an idle signal or holding pattern) when no bicycle or mobile target is detected. Such a default indicia, unlike a blank screen, would alert drivers of motor vehicles that the display unit is working and that no target is detected. Without limitation, the default indicia can be a moving pattern or a static display and can have any suitable shape, dimensions, and/or colour. Of course, the default indicia should be selected to be at least relatively visibly distinct from the warning itself, to mitigate potential confusion. For example, if the warning is a flashing stylized bicycle, the default indicia should not also be a flashing stylized bicycle.

In a preferred embodiment, the sensor 20 is an infrared imaging device, such as an infrared camera. Specifically, it is preferred that the sensors 20 are capable of operating with little to no difference in accuracy at any time of day and regardless of outdoor lighting conditions.

In some embodiments, the target to be detected is in motion. However, as should be understood, in some cases, the target may have stopped or may be travelling in a direction that is not the same as that of the motor vehicle traffic. For example, in some cases, a cyclist may lose control of their bicycle, or need to pull over in a bicycle lane to correct a problem with their bicycle. Accordingly, in preferable embodiments, the image analysis module is also able to detect targets that are stationary or moving in an unanticipated direction and/or manner.

In some embodiments of the invention, further, the warning system may be integrated with other systems such as centrally operated traffic control systems. For instance, the systems and method disclosed herein may be integrated with pre-existing signalling systems that control traffic at an intersection, including lights and countdown timers. As well, data obtained from the systems disclosed herein may be used as a basis for other decisions (e.g., may be used to identify "problem corners" that need additional engineering work for safety purposes, etc.).

In some embodiments where the warning system is integrated with a distributed or remote system such as a traffic control system, the warning system may simply send a 'bicycle detected' and/or 'no bicycle detected' signal to the other system. In other embodiments, the data sent by the warning system may be more detailed. As would be clear, suitable data in any particular case may depend on the geometry of the intersection, the anticipated traffic patterns, etc., and may be determined by the operator/traffic engineer and/or the person skilled in the art.

As well, in some embodiments, the field of view and/or angle of the sensor may be adjusted by an operator/traffic engineer. In some embodiments, these parameters are determined by the installation of hardware components at the area of interest. In other embodiments, these parameters are at least partially dependent on a software implementation. Software-dependent parameters can, in some embodiments, be changed after installation of the sensor/device at the roadway. Suitable adjustments can be made in light of factors including but not limited to the geometry of the relevant intersection, the side of the road on which motor vehicle traffic drives, whether bicycle traffic is provided with a separated lane or shares an undifferentiated roadway with motor vehicle traffic, etc.

In one embodiment, the sensor 20 has a range of approximately 15 feet (4.57 m). That is, in such an embodiment, a mobile target would be detected within 15 feet (4.57 m) of the sensor 20. As would be clear, longer and/or shorter ranges are possible, depending on the desired implementation of the system and the vehicles, speed limits, and intersection geometries involved. Similarly, other specifications of the sensor 20 may depend on the vehicles, speed limits, and intersection geometries. For example, a sensor to be used at a comparatively wide bicycle lane might use a lens having a smaller diameter than that of a similar sensor to be used at a comparatively narrow bicycle lane.

In some embodiments, the sensor and/or display unit are weather-resistant or weatherized. For example, the sensor and/or display unit are preferably adapted to outdoor use in climates where they are to be located. As would be clear, suitable adaptations for one climate or common weather patterns may not be suitable for climates/common weather patterns in other geographic locations. The person skilled in the art can identify relevant weather- and climate-proofing features for a given location.

As should be understood, the system disclosed herein may use any suitable power source. In some implementations, the system and/or device may be directly connected to a municipal or regional power network. In other implementations, the system and/or device may be battery-powered or may comprise additional/auxiliary power sources. For example, in one embodiment, the device comprises a solar panel and a battery unit for collecting and storing power that is then used to power the various components of the device (such as the display unit 40, etc.). Further, as would be clear, in embodiments where the components of the system are remote from each other, multiple different or different types of power sources may be used.

Figure 2:
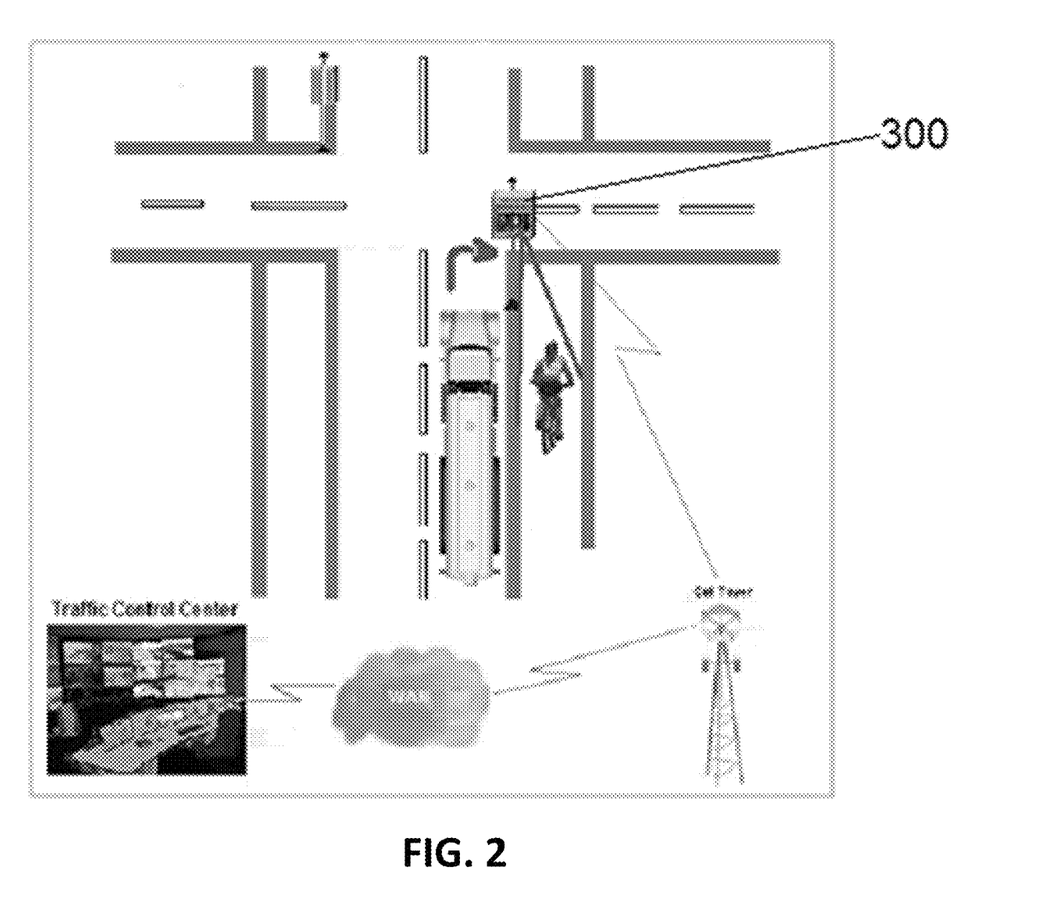
FIG. 2 is a schematic image of an intersection with a warning device according to one implementation of the invention.

Referring now to FIG. 2, a schematic diagram of an intersection is provided. This schematic shows one implementation of a networked warning system disclosed herein. The intersection of two roadways is at the top centre of the image. Note that the vertical roadway in this image has a separated bicycle lane beside the motor vehicle lanes but the horizontal roadway does not. Additionally, there are no other signalling devices or signs at this intersection.

A transport truck and a bicycle are both approaching the intersection from the bottom of the image. As indicated by the arrow, the transport truck intends to make a right turn onto the horizontal roadway. An integrated warning device 300 (i.e., a single device integrating a sensor and a display unit) is positioned at the intersection, between the motor vehicle lane and the bicycle lane. As shown schematically, the sensor on device 300 is oriented to capture images of the bicycle lane. The images are then transmitted to a data processing unit maintained (in this schematic example) by a traffic control centre, via a cellular network and a WAN. The data processing unit at the traffic control centre analyzes the images as described above and generates a signal to send back to the device 300. Upon receiving that signal, the display unit of the device 300 displays a warning.

Figure 3A:
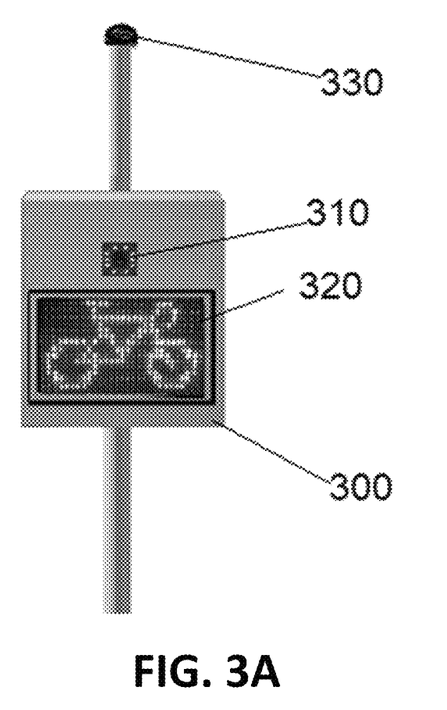
FIG. 3A is a schematic image of the warning device according to the implementation of FIG. 2, displaying a warning indicia.
Figure 3B:
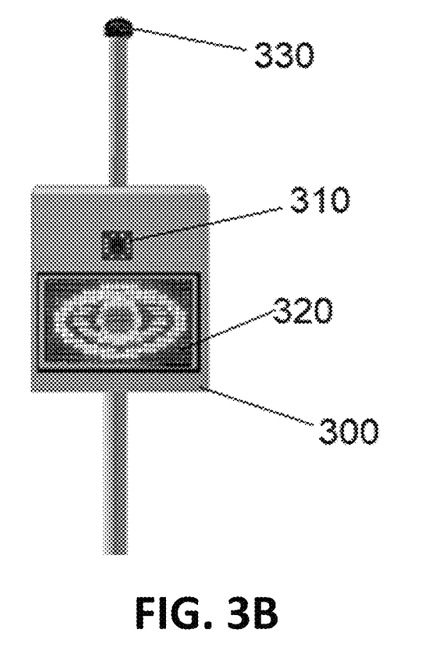
FIG. 3B is a schematic image of the warning device according to the implementation of FIG. 2, displaying a default indicia.

FIGS. 3A and 3B show the integrated device 300 in more detail. The device has a sensor 310, a display unit 320, and an antenna 330 for communicating with the remote data processing unit. In FIG. 3A, the display unit 320 is displaying a warning. In this exemplary implementation, the display unit 320 is an array of LEDs and the warning is configured as a stylized bicycle. As discussed above, however, the display unit 320 can have any suitable form and the warning may be any suitable indicia, including words, images, moving patterns, distinct colours and/or a single light. In FIG. 3B, the display unit 320 is displaying a default indicia (i.e., an idle signal) to indicate that the system is functioning but that no target has been detected. In this exemplary implementation, the default indicia is a flashing stylized eye. However, again, the default indicia can have any suitable design and/or format.

Figure 4A:
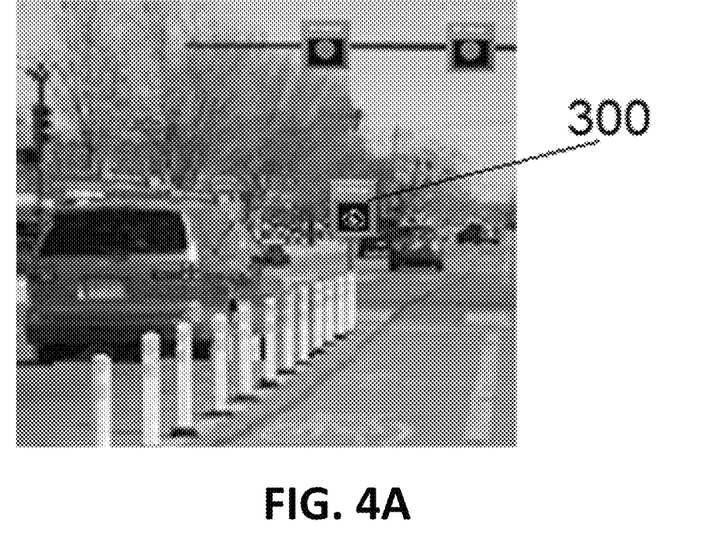
FIGS. 4A, 4B, and 4C are mock-up images of the intersection of FIG. 2 with the warning device in use.
Figure 4B:
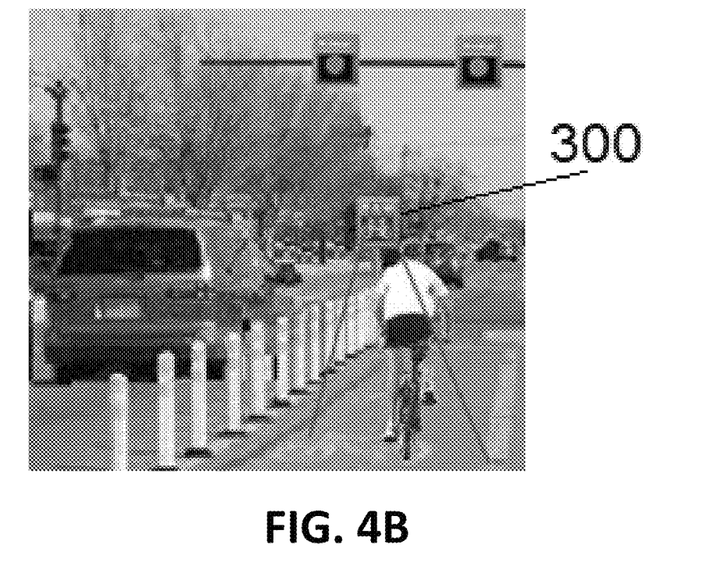
Figure 4C:
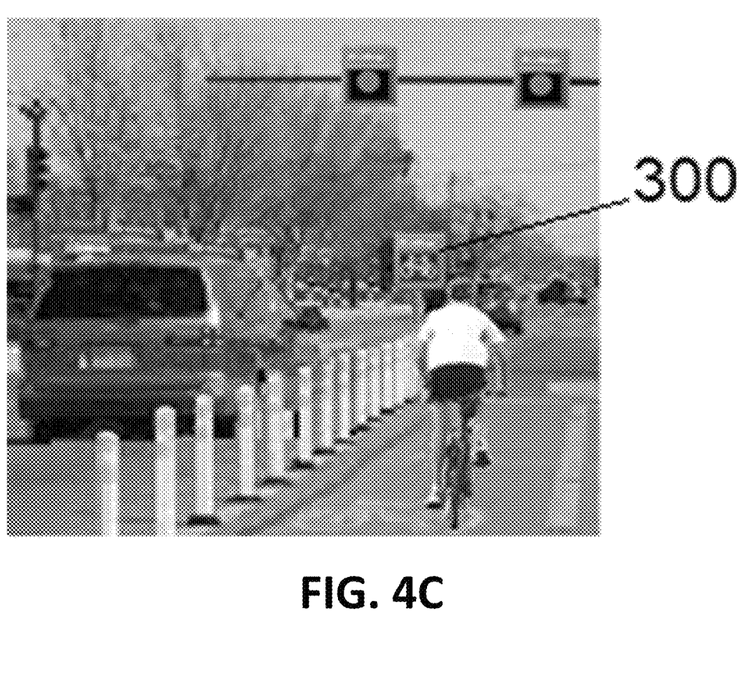

FIGS. 4A, 4B, and 4C are mock-up images showing the operation of the integrated device 300. In FIG. 4A, there is motor vehicle traffic but no bicycle. As can be seen, the display unit of the device 300 is displaying a default indicia (i.e., a flashing eye). In FIG. 4B, a bicycle is within the field of view of the sensor of the device 300. The field of view in this image is indicated by red lines emanating from the sensor device; as would be understood, these lines are purely for illustrative purposes. As can be seen in this image, the display unit of the device 300 is displaying a warning of the bicycle. In FIG. 4C, while the bicycle is still present in the bicycle lane (and/or while the display timer is still active), the display unit of the device 300 continues to display the warning.

Figure 5:
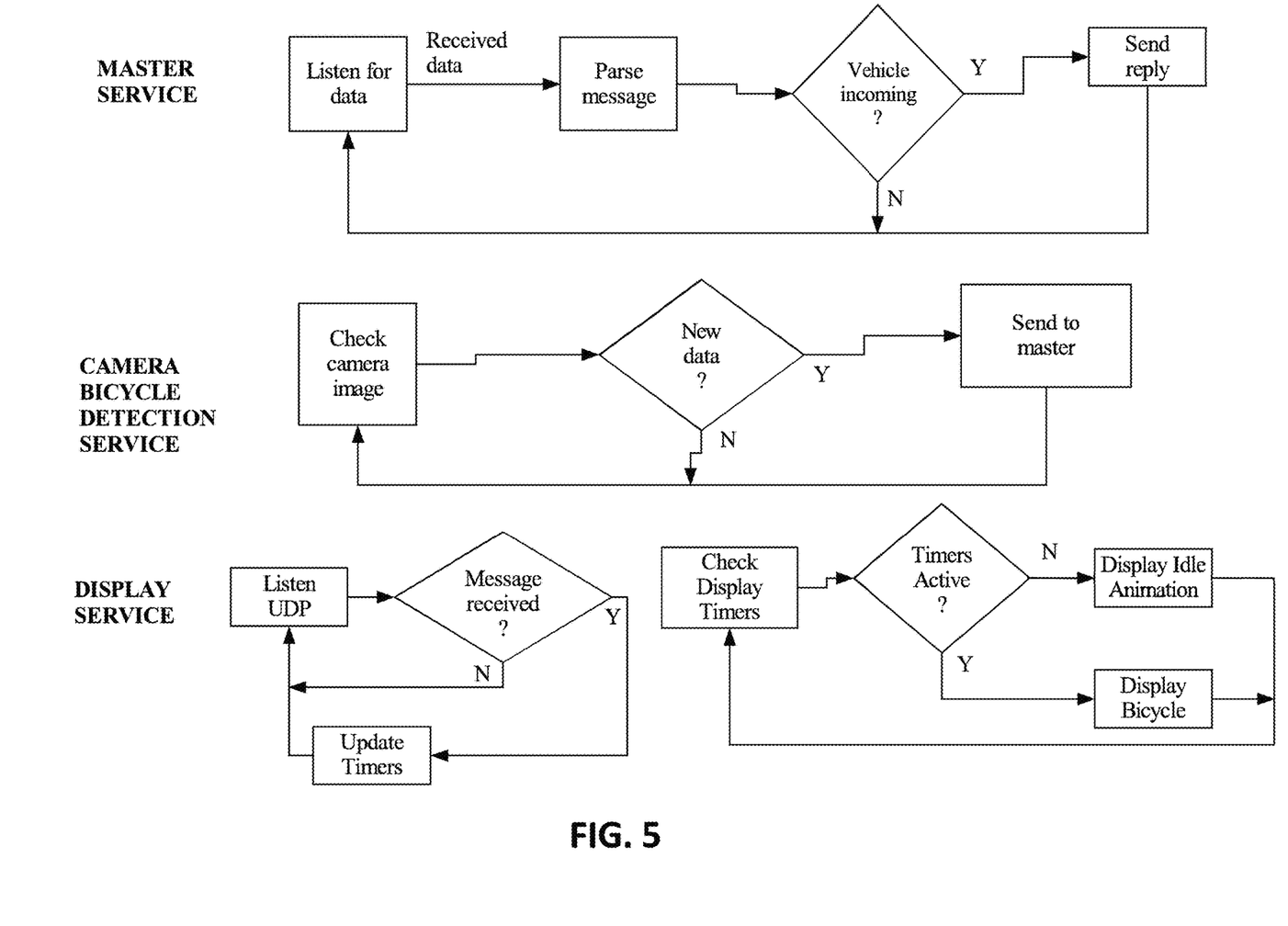
FIG. 5 is a flowchart detailing processes according to one implementation of the invention.

FIG. 5 shows flowcharts for several processes according to one implementation of the invention. The "Master Service" flow, at the top of the figure, details a high-level process for aspects of the invention. According to this flow, the system listens for data (i.e., for an image of the area). When data is received, the received data message is parsed (i.e., analyzed to determine the presence of a mobile target). If a target is not detected, the process begins again with a new image. If a target is detected, the system sends a reply/signal to the display service.

The center flowchart of FIG. 5 details an auxiliary service ("Camera Bicycle Detection Service"). Under this flow, an image received from a camera is preprocessed at the camera side (before entering the Master Service process). If, through the pre-processing, the image is determined to contain new/not-yet analyzed content, that image is sent to the Master Service process for bicycle detection. If the image is determined not to contain new content, the image is discarded and another image is preprocessed.

The "Display Service" flowcharts at the bottom of FIG. 5 illustrate high-level processes for the display unit in coordination with the Master Service, according to this implementation of the invention. The display unit has a 'Listening' process (flowchart on the left) and a 'Display' process (flowchart on the right). In the Listening process, if a message is received, one or more timers connected to the display unit are updated. If no message is received, the timers are not changed. In the Display process, the timers are checked. If the timers are active, a bicycle was detected and the fixed time for the bicycle to leave the area has not yet elapsed. Accordingly, a warning such as a bicycle animation is displayed. If the times are inactive, the default indicia is displayed.

Figure 6:
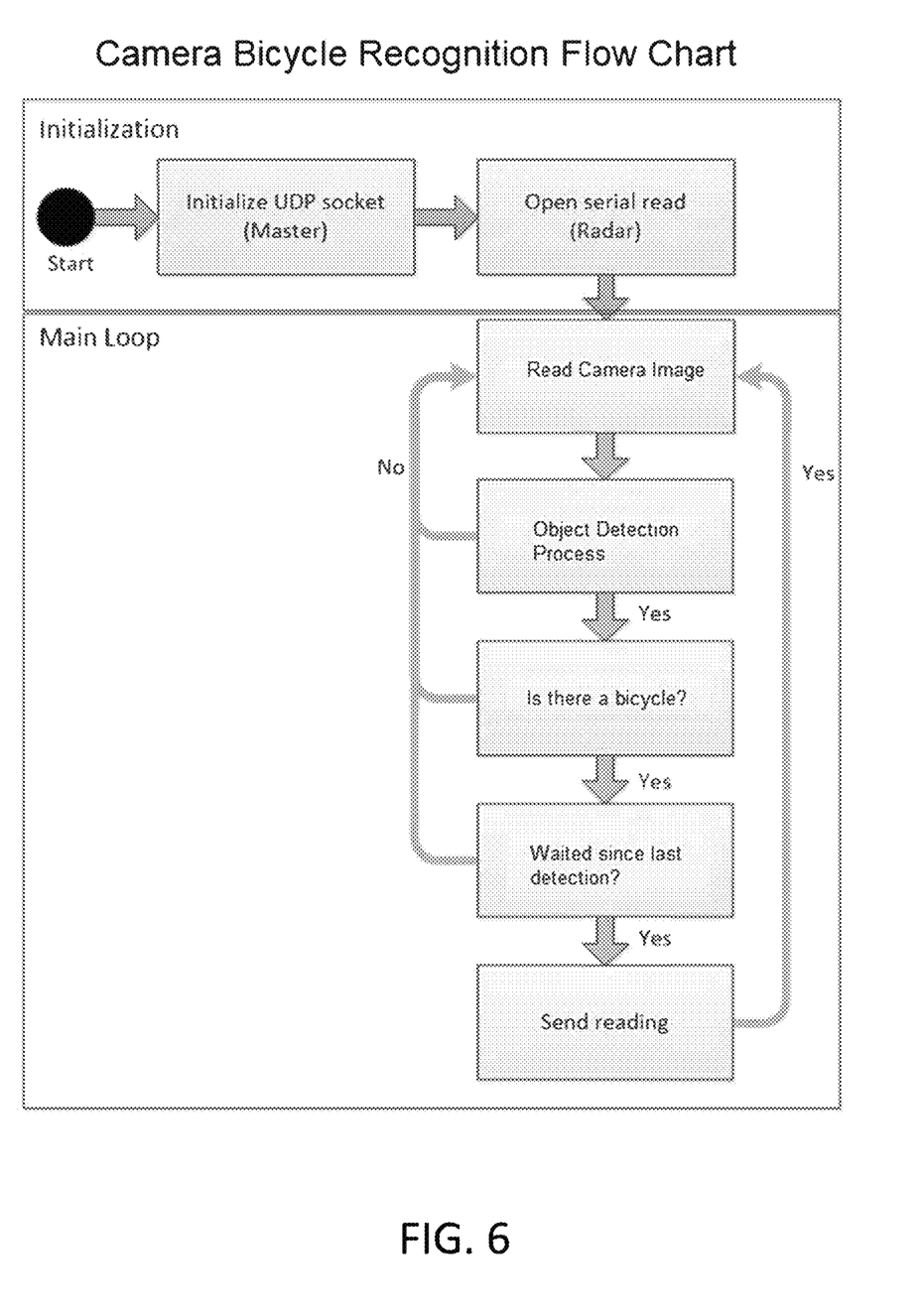
FIG. 6 is a flowchart detailing an image analysis process according to one implementation of the invention.

FIG. 6 further details the process for mobile target detection in images according to the implementation used in FIG. 5. First are initialization steps, including initializing a UDP socket and connecting the data processing unit 30 to a feed from the sensor/imaging device 20. Then, the first image is received and read (i.e., by the data processing unit 30). An object detection process is conducted on the image. If no objects are present, another image is selected for analysis. If there are objects present, it is determined whether any of the objects are a bicycle. (As would be understood, these steps may, in some implementations, be performed as a single step. That is, a system may determine in a single pass whether any bicycles are present in the image.) If none of the objects are bicycles, another image is selected for analysis. If a bicycle is detected, a timer is checked. If a fixed time has not elapsed, the bicycle is not considered a 'new' bicycle and another image is selected for analysis. If the fixed time has elapsed, the data processing unit 30 sends a signal to the display unit 40 and another image is selected for analysis.

Figure 7:
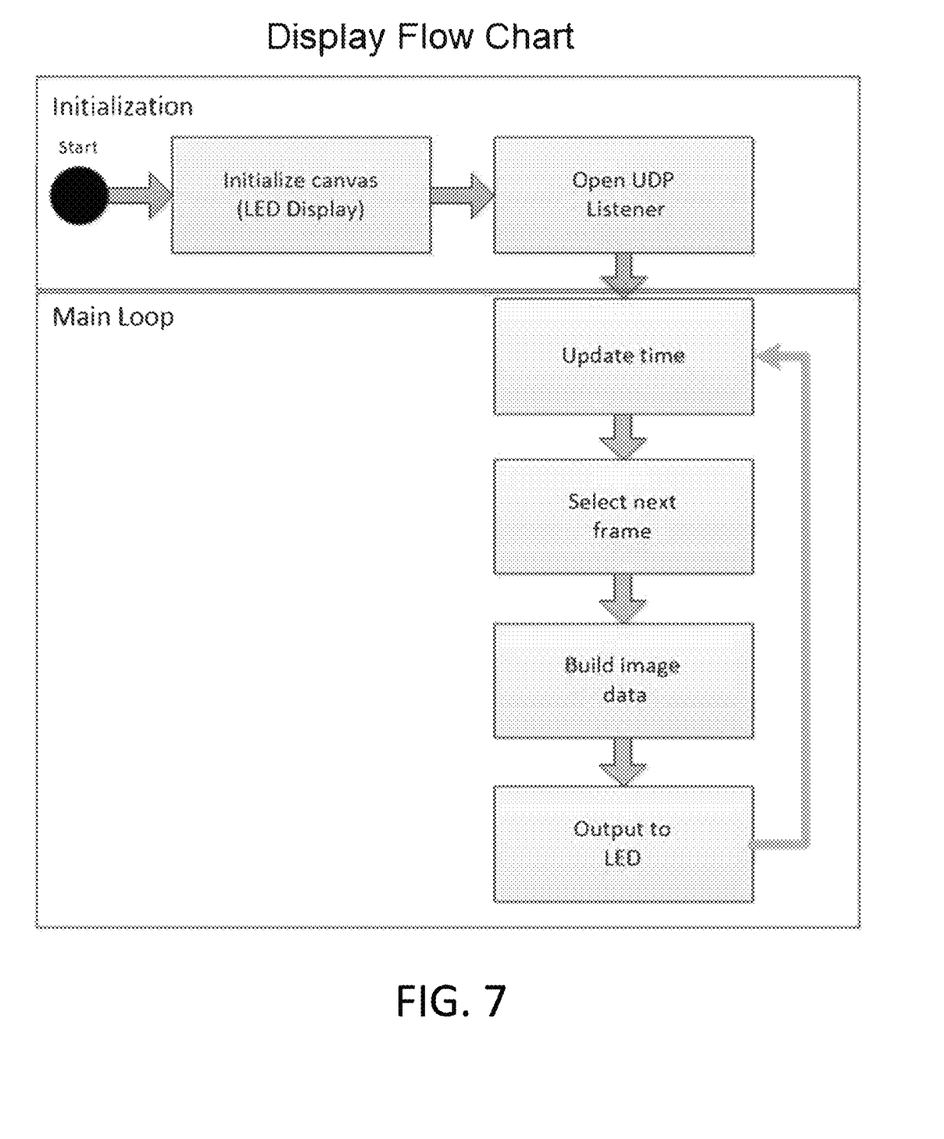
FIG. 7 is a flowchart detailing a display analysis process according to one implementation of the invention.

FIG. 7 further details the process for displaying a warning from the display unit side. First are initialization steps, including initializing the display unit canvas (in this implementation, an LED canvas). A listening service of the display unit is then activated. The timer(s) associated with the display unit is/are continuously checked. Based on the status of the timer(s), the next frame to display is selected. The next frame may be a warning or a default indicia, as discussed elsewhere herein. Directions to display the frame are then selected and passed to the LED canvas.

As would be understood, FIGS. 5 to 7 are merely exemplary and should not be construed as limiting the invention in any way.

Figure 8:
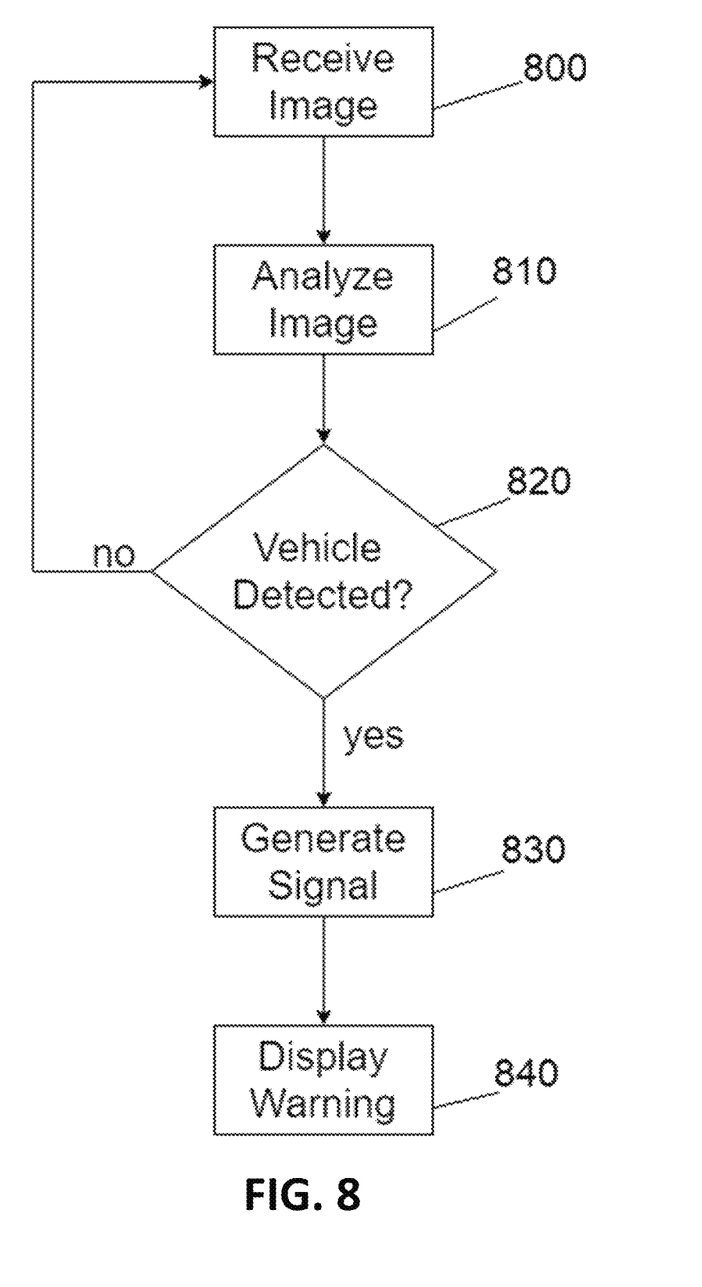
FIG. 8 is a flowchart detailing a method according to one aspect of the invention.

FIG. 8 is another flowchart detailing a method according to an aspect of the invention. At step 800, an image is received. The image is then analyzed at step 810. At step 820, if a mobile target (e.g., a bicycle) is not detected during the analysis step, the method returns to step 800 with another image. However, if a target vehicle is detected during the analysis step, the method proceeds to step 830, where a signal is generated. The signal is passed to a display unit which displays a warning at step 840.

As noted above, for a better understanding of the present invention, the following references may be consulted. Each of these references is hereby incorporated by reference in its entirety:

[1] Wei Liu, Dragomir Anguelov, Dumitru Erhan, Christian Szegedy, Scott Reed, Cheng-Yang Fu, Alexander C. Berg, "SSD: Single Shot MultiBox Detector", arxiv: 1512.02325v5 [cs.CV], 29 Dec. 2016, available at https://arxiv.org/abs/151.0232v5; and

[2] Manish Chablani, "SSD: Single Shot MultiBox Detector explained", Medium, 21 Aug. 2017, available at https://medium.com/@ManishChablani/ssd-single-shot-multibox-detector-explained-38533c27f75f.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. However, as noted above, the image(s) of this invention are not required to represent visible light patterns. Rather, the image(s) constitute a mapping of a physical area, typically though not necessarily a roadway, according to some parameter in which bicycles/mobile targets may be detected.

Embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a data processing unit over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A system for displaying a warning of a presence of a mobile target, said system comprising:
    a sensor for obtaining an image of an area;
    a data processing unit for receiving said image, said data processing unit comprising an image analysis module for determining said presence of said target when said target is within said area and wherein said data processing unit generates a signal when said target is determined to be present within said area; and
    a display unit for receiving said signal and for displaying said warning,
    wherein said warning is a visual warning,
    wherein said display unit is positioned at a roadway such that said display unit is visible to a driver of a motor vehicle on said roadway,
    wherein at least one projected path of the motor vehicle intersects at least one projected target path,
    and wherein said image analysis module implements a technique to analyze said image, said technique comprising applying a plurality of bounding boxes with different aspect ratios to said image, thereby producing a plurality of intermediate images, each of said plurality of intermediate images having a different one of said bounding boxes, and analyzing said plurality of intermediate images using a convolutional neural network to thereby predict likelihoods that said target is inside each of said bounding boxes, said likelihoods being used to determine said presence or an absence of said target.

2. The system according to claim 1, wherein said mobile target comprises at least one of: a bicycle; a cyclist; a pedestrian; a foot-powered vehicle; a pedal-powered vehicle; a limited-speed vehicle; a low-speed vehicle; and an operator of at least one of a foot-powered vehicle; a pedal-powered vehicle; a limited-speed vehicle; and a low-speed vehicle.

3. The system according to claim 1, wherein said area is a part of said roadway.

4. The system according to claim 3, wherein said area includes a region adjacent to said motor vehicle.

5. The system according to claim 4, wherein said region includes a blind spot of said driver.

6. The system according to claim 4, wherein said mobile target travels in a same direction as said motor vehicle.

7. The system according to claim 1, wherein said sensor is an infrared imaging device.

8. The system according to claim 1, wherein images of said area are received from multiple sensors.

9. The system according to claim 1, wherein said display unit displays a default indicia until receiving said signal from said data processing unit.

10. The system according to claim 1, wherein said sensor and said display unit are integrated into a single physical device.

11. A method for displaying a warning of a presence of a mobile target, said method comprising:
    receiving an image of an area;
    analyzing said image to determine said presence of said target when said target is within said area;
    generating a signal when said target is determined to be present within said area;
    sending said signal to a display unit; and
    displaying said warning on said display unit, wherein said warning is a visual warning,
    wherein said display unit is positioned at a roadway such that said display unit is visible to a driver of a motor vehicle on said roadway,
    wherein at least one projected path of the motor vehicle intersects at least one projected target path,
    and wherein analyzing said image comprises implementing a technique, said technique comprising applying a plurality of bounding boxes with different aspect ratios to said image, thereby producing a plurality of intermediate images, each of said plurality of intermediate images having a different one of said bounding boxes, and analyzing said plurality of intermediate images using a convolutional neural network to predict likelihoods that said target is inside each of said boxes, said likelihoods being used to determine said presence or an absence of said target.

12. The method according to claim 11, wherein said mobile target comprises at least one of: a bicycle; a cyclist;

a pedestrian; a foot-powered vehicle; a pedal-powered vehicle; a limited-speed vehicle; a low-speed vehicle; and an operator of at least one of a foot-powered vehicle; a pedal-powered vehicle; a limited-speed vehicle; and a low-speed vehicle.

13. The method according to claim 11, wherein said area is a part of said roadway.

14. The method according to claim 13, wherein said area includes a region adjacent to said motor vehicle.

15. The method according to claim 14, wherein said region includes a blind spot of said driver.

16. The method according to claim 14, wherein said mobile target travels in a same direction as said motor vehicle.

17. The method according to claim 11, wherein said image is received from an infrared imaging device.

18. The method according to claim 11, wherein multiple simultaneous images of said area are received, wherein said multiple simultaneous images cover said area from different viewpoints.

19. The method according to claim 11, wherein said display unit displays a default indicia until receiving said signal from said data processing unit.

20. The method according to claim 11, wherein said sensor and said display unit are integrated into a single physical device.

21. Non-transitory computer-readable media having encoded thereon computer-readable and computer-executable instructions that, when executed, implement a method for displaying a warning of a presence of a mobile target, said method comprising:
receiving an image of an area;
analyzing said image to determine said presence of said target when said target is within said area;
generating a signal when said target is determined to be present within said area;
sending said signal to a display unit; and
displaying said warning on said display unit, wherein said warning is a visual warning,
wherein said display unit is positioned at a roadway such that said display unit is visible to a driver of a motor vehicle on said roadway,
wherein at least one projected path of the motor vehicle intersects at least one projected target path,
and wherein analyzing said image comprises implementing a technique, said technique comprising applying a plurality of bounding boxes with different aspect ratios to said image, thereby producing a plurality of intermediate images, each of said plurality of intermediate images having a different one of said bounding boxes, and analyzing said plurality of intermediate images using a convolutional neural network to predict likelihoods that said target is inside each of said boxes, said likelihoods being used to determine said presence or an absence of said target.

* * * * *